(12) United States Patent
Liu et al.

(10) Patent No.: US 10,490,843 B2
(45) Date of Patent: Nov. 26, 2019

(54) FLEXIBLE BATTERY WITH 180 DEGREE OPERATIONAL BEND RADIUS

(71) Applicant: Nano and Advanced Materials Institute Limited, Hong Kong (HK)

(72) Inventors: Chenmin Liu, Hong Kong (HK); Chi Ho Kwok, Hong Kong (HK); Shengbo Lu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 87 days.

(21) Appl. No.: 15/924,299

(22) Filed: Mar. 19, 2018

(65) Prior Publication Data

US 2018/0294509 A1 Oct. 11, 2018

Related U.S. Application Data

(60) Provisional application No. 62/602,010, filed on Apr. 10, 2017.

(51) Int. Cl.
*H01M 10/052* (2010.01)
*H01M 10/0565* (2010.01)
(Continued)

(52) U.S. Cl.
CPC ......... *H01M 10/052* (2013.01); *H01M 2/162* (2013.01); *H01M 10/045* (2013.01);
(Continued)

(58) Field of Classification Search
CPC ............ H01M 10/052; H01M 10/058; H01M 10/0525; H01M 2/162; H01M 10/0436;
(Continued)

(56) References Cited

U.S. PATENT DOCUMENTS

| 8,785,030 B2 | 7/2014 | Ueda |
| 8,815,432 B2 | 8/2014 | Jo et al. |

(Continued)

FOREIGN PATENT DOCUMENTS

| CN | 101335343 A | 12/2008 |
| CN | 102268783 A | 12/2011 |

(Continued)

OTHER PUBLICATIONS

Liangbing Hu et al., "Thin, Flexible Secondary Li-Ion Paper Batteries," ACS Nano, 2010, pp. 5843-5848, vol. 4.

(Continued)

*Primary Examiner* — Stewart A Fraser
(74) *Attorney, Agent, or Firm* — Idea Intellectual Limited; Margaret A. Burke; Sam T. Yip (57) ABSTRACT

A flexible and foldable lithium ion battery is disclosed having an operational bend radius of 180 degrees with no interruption in supply of electrical power. The lithium ion battery includes a high-elasticity separator sponge having a porosity of approximately 70% to approximately 90%. The separator is a polymer-based fiber mat having fibers with a submicron diameter. The separator sponge has a thickness in a range of approximately 5 to 50 microns, an air permeability of approximately 100 to approximately 300 s/100 ml, and a puncture resistance of approximately 350 to approximately 950 N. First and second electrodes are disposed on either side of the separator sponge and include active materials positioned on thin metal current collectors. A liquid electrolyte is absorbed by the separator sponge. The battery may be folded upon itself without loss of power.

16 Claims, 10 Drawing Sheets

(51) Int. Cl.
  H01M 10/04 (2006.01)
  H01M 2/16 (2006.01)
  H01M 10/0525 (2010.01)
  H01M 10/058 (2010.01)
  H01M 4/485 (2010.01)
  H01M 4/505 (2010.01)
  H01M 4/525 (2010.01)
  H01M 4/58 (2010.01)

(52) U.S. Cl.
  CPC ... H01M 10/0436 (2013.01); H01M 10/0459 (2013.01); H01M 10/058 (2013.01); H01M 10/0525 (2013.01); H01M 10/0565 (2013.01); H01M 4/485 (2013.01); H01M 4/505 (2013.01); H01M 4/525 (2013.01); H01M 4/5825 (2013.01); H01M 2220/30 (2013.01)

(58) Field of Classification Search
  CPC .......... H01M 10/0459; H01M 10/045; H01M 10/0565
  See application file for complete search history.

(56) References Cited

U.S. PATENT DOCUMENTS

| | | | |
|---|---|---|---|
| 8,822,082 B2 | 9/2014 | Katayama et al. | |
| 9,065,122 B2 | 6/2015 | Orilall et al. | |
| 9,293,749 B2 | 3/2016 | Seo et al. | |
| 2012/0276434 A1 | 11/2012 | Gaikwad et al. | |
| 2013/0209877 A1 | 8/2013 | Kren et al. | |
| 2013/0236766 A1 | 9/2013 | Seo et al. | |
| 2015/0044574 A1 | 2/2015 | Cakmak et al. | |
| 2015/0140398 A1* | 5/2015 | Yamazaki | H01M 2/1686 429/127 |
| 2015/0255828 A1* | 9/2015 | Momo | H01M 4/583 429/127 |
| 2015/0360409 A1 | 12/2015 | Liu et al. | |
| 2016/0149253 A1* | 5/2016 | Yi | H01M 2/22 429/127 |
| 2016/0365556 A1 | 12/2016 | Liu et al. | |
| 2017/0263972 A1* | 9/2017 | Rho | H01M 2/02 |

FOREIGN PATENT DOCUMENTS

| | | |
|---|---|---|
| CN | 102544574 A | 7/2012 |
| CN | 102587040 A | 7/2012 |
| CN | 102629679 A | 8/2012 |
| CN | 104081557 A | 10/2014 |
| DE | 112012004667 T5 | 10/2014 |
| JP | 2015069957 A | 4/2015 |
| JP | 2016136516 A | 7/2016 |
| JP | 2017004956 A | 1/2017 |
| KR | 101280897 B1 | 7/2013 |

OTHER PUBLICATIONS

Neelam Singh et al., "Paintable battery," Scientific Reports 2, 2012, Article No. 481, pp. 1-5.
Yuan Liao et al., "Fabrication of polyvinylidene fluoride (PVDF) nanofiber membranes by electro-spinning for direct contact member distillation," Journal of Membrane Science, 2013, pp. 30-39, vol. 425-426.
Jia-Zhao Wang et al., "Flexible free-standing graphene-silicon composite film for lithium-ion batteries," Electrochemistry Communications, 2010, pp. 1467-1470, vol. 12.
Wei Li et al., "Synthesis of stable ultra-small Cu nanoparticles for direct writing flexible electronics," Applied Surface Science, 2014, pp. 240-245.
Peng Zhang et al., "Free-standing and bendable carbon nanotubes/TiO2 nanofibers composite electrodes for flexible lithium ion batteries," Electrochimica Acta, 2013, pp. 41-47, vol. 104.
Ken R. Atkinson et al., "Multifunctional carbon nanotube yarns and transparent sheets: Fabrication, properties, and applications," ScienceDirect, 2007, pp. 339-343, vol. 394.
Mitch Jacoby et al., "Batteries get flexible," Chemical & Engineering News, 2013, pp. 13-18, vol. 91, issue 18.
Min Yang et al., "Membranes in Lithium Ion Batteries", Membranes, 2012, pp. 367-383.
Weiya Chen et al., "Improved performance of PVdF-HFP/PI nanofiber membrane for lithium ion battery separator prepared by a biocomponent cross-electrospinning method," Materials Letters, 2014, pp. 67-70.
Yanhuai Ding et al., "The ionic conductivity and mechanical property of electrospun P(VdF-HFP)/PMMA membranes for lithium ion batteries," Journal of Membrane Science, 2009, pp. 56-59.
Office Action of Japan Patent Application No. 2018-071935 dated Jun. 11, 2019.

* cited by examiner

FLEXIBLE BATTERY WITH 180 DEGREE OPERATIONAL BEND RADIUS

CROSS-REFERENCE TO RELATED APPLICATIONS

This application claims priority to U.S. provisional patent application No. 62/602,010 filed Apr. 10, 2017, the disclosure of which is incorporated by reference herein.

FIELD OF THE INVENTION

The present invention relates to flexible rechargeable batteries and, more particularly, to flexible lithium ion batteries that remain operational even when folded, that is, they have an operational bend radius of 180 degrees.

BACKGROUND

The ever-increasing use of portable electronics presents challenges for the makers of batteries that power portable devices. Wearable electronics, in particular, require thin and light batteries to ensure the comfort and safety of the wearer. As wearable electronics assume more complex shapes, there is a demand for batteries that can curve and flex along with the wearer's body.

Various flexible batteries have been described. However, these batteries tend to includes various rigid or brittle components, such as ceramic separators, that limit the degree to which they may be bent. Thus, the overall battery may not be substantially deformed or reshaped without a loss of battery operation. Consequently, prior flexible batteries may only provide limited degrees of curvature, permitting bending, for example, sufficient to form a bracelet configuration. Such batteries are not foldable, that is, they do not possess an operational bend radius of 180 degrees.

SUMMARY

Accordingly, the present invention provides a flexible and foldable lithium ion battery. The lithium ion battery includes a high-elasticity separator sponge having a porosity of approximately 80% to approximately 90%. The separator is a polymer-based fiber mat having fibers with a submicron diameter. The separator sponge has a thickness in a range of approximately 5 to approximately 50 microns, an air permeability of approximately 100 to approximately 300 s/100 ml, and a puncture resistance of approximately 350 to approximately 950 N.

A first electrode is disposed on a first side of the separator sponge and includes a first active material positioned on one or both sides of a first metal current collector, the first metal current collector having a thickness of approximately 5 microns to approximately 100 microns. A second electrode is disposed on a second side of the separator sponge and includes a second active material positioned on one or both sides of a second metal current collector having a thickness of approximately 5 microns to approximately 100 microns.

A liquid electrolyte is absorbed by the separator sponge. The foldable battery has an operational bend radius of up to 180 degrees with no interruption in supply of electrical power. That is, the battery may be folded upon itself without loss of power.

BRIEF DESCRIPTION OF THE DRAWINGS

FIG. 5A depicts battery cycling for the present batteries vs. FIG. 5B depicting battery cycling for commercial separator batteries.

FIG. 6A shows the open circuit voltage of a disclosed battery before folding while

DETAILED DESCRIPTION

A. Battery Structure and Composition

Figure 1:
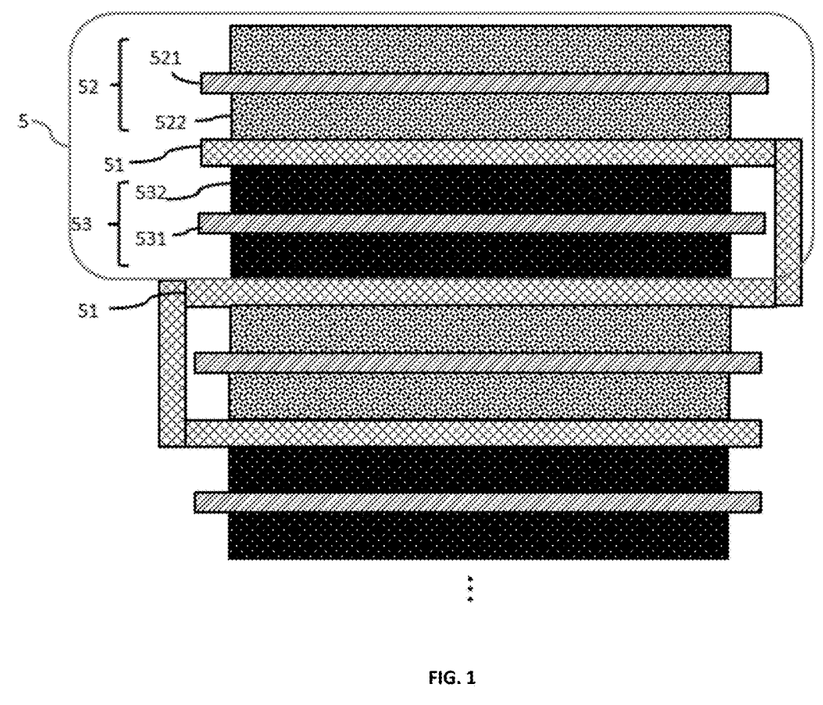
FIG. 1 depicts a stacked battery structure according to an embodiment.

FIG. 1 schematically depicts a cross-section of a portion of a flexible, foldable lithium ion battery according to an aspect of the disclosure. All of the batteries of the present disclosure have an operational bend radius of 180 degrees. The term "operational bend radius" as used herein, is the degree to which a battery may be curved and still generate electrical power without an interruption in operation. An operation bend radius of 180 degrees means that a battery may be completely folded upon itself while still generating electrical power.

In FIG. 1, element 5 represents a single cell of a battery that includes a first current collector 521, a second current collector 531, and a separator, 51. The first current collector 521 may be selected from a metal such as aluminium. The aluminium may be a sheet having a thickness of approximately 5 microns to approximately 100 microns. An active material 522 may be coated on one or both sides of the aluminium sheet to form a cathode. Active materials may be selected from, for example, $LiCoO_2$, $LiMn_2O_4$, $Li_2MnO_3$, $LiNiMnCoO_2$, $LiNiCoAlO_2$, $LiFePO_4$, or $LiNi_{0.5}Mn_{1.5}O_4$ however other active materials and mixtures thereof may also be used.

The second current collector may be selected from a metal such as copper. The copper may be a sheet having a thickness of approximately 5 microns to approximately 100 microns. An active material 532 may be coated on one or both sides of the copper sheet to form an anode. Active materials for the anode include carbon-based active materials such as graphite, carbon nanotubes, graphene, silicon, silicon/carbon composites, germanium, tin, metal oxides, metal hydrides, and mixtures thereof.

A separator 51 is positioned between the current collectors, preventing contact of the current collectors with each other. The separator 51 is a highly porous, highly elastic polymer fiber mat sponge with resilience sufficient to maintain separation of the current collectors 521 and 531 despite bending, folding, cutting, or foreign object penetration of the battery. As used herein, the term "sponge" relates to a porous, absorbent, and elastic structure that holds liquid while maintaining resilience. A sponge returns to its original shape following deformation, that is, a sponge may be squeezed into a smaller area as long as an external force is maintained. Once the external force is removed, the sponge regains its original shape and volume. As a sponge, the separator securely holds a liquid electrolyte but also maintains sufficient absorbing capability to hold the liquid electrolyte in a leak-free condition when an outer battery housing is punctured or cut, preventing escape of hazardous electrolyte. Also, the resiliency of the separator sponge returns the electrodes to their proper, separated positions following mechanical abuse (such as cutting and puncturing), giving the overall structure a self-recovery property. The term "self-recovery," as used herein, relates to a battery structure that can return to its original configuration following mechanical abuse such that generation of power resumes following an interruption caused by mechanical abuse. The separator sponges, due to their sponge properties, return to their original shape and volume, enabling self-recovery of the overall battery structure.

The electrolyte used in the battery may include one or more organic solvents such as one or more of ethylene carbonate, dimethyl carbonate, and diethyl carbonate. Dissolved in the solvent are one or more lithium salts such as $LiPF_6$, $LiBF_4$, or $LiClO_4$. The composition of the electrolyte is typically adjusted based on the active materials selected for use in the cathode and anode.

Figure 2:
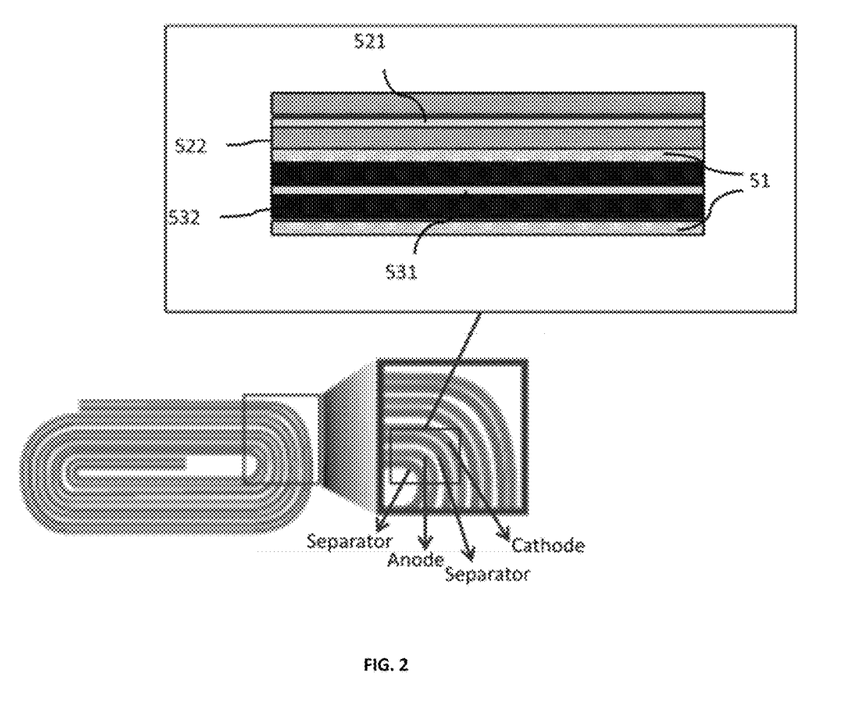
FIG. 2 depicts a jellyroll battery structure according to an embodiment.

Although FIG. 1 depicts a cell of a battery based on a stacked structure of components, layers of components may be formed and rolled into a so-called "jellyroll" structure, as depicted in FIG. 2. In FIG. 2, the separator layer 51 is positioned not only between the cathode and anode of each "cell" layer but is also positioned between adjacent cell layers to prevent shorting between electrodes, creating an overall flexible and resilient structure that is self-recoverable.

The separator sponge may be formed from a mat of submicron fibers. In one aspect, the fibers may have a diameter of between approximately 100 nm to 300 nm. The porosity may be about 60% to about 90% with an average pore size of less than about 1 micron. In particular, the submicron fibers may be fabricated from polymers such as poly(vinylidene fluoride) (PVDF), polyimide (PI), polyamide (PA), polyacrylonitrile (PAN), poly(ethylene terephthalate) (PET), poly(vinylidene fluoride-hexafluoropropylene) (PVDF-HFP), poly(vinylidene fluoride-co-chlorotrifluoroethylene) (PVDF-co-CTFE), or mixtures thereof.

In another embodiment, separator sponge may be a nonwoven polymer fiber mat in which the polymer fibers are a composite of a first polymer material and a second polymer material. The first polymer material may include poly(vinylidene fluoride) (PVDF), polyimide (PI), polyamide (PA) or polyacrylonitrile (PAN). The second polymer material may include polyethylene glycol (PEG), polyacrylonitrile (PAN), poly(ethylene terephthalate) (PET), poly(vinylidene fluoride) (PVDF), poly(vinylidene fluoride-hexafluoropropylene) (PVDF-HFP) or poly(vinylidene fluoride-co-chlorotrifluoroethylene) (PVDF-co-CTFE), wherein the second polymer material is different from the first polymer material. The first and second polymer materials may be in a weight ratio ranging from about 3:1 to about 1:1, more particularly about 3:1 to about 2:1, and more particularly about 3:1 to about 3:2, and more particularly about 3:1.

PVDF has been widely used for making ultrafiltration and microfiltration membranes owing to its excellent chemical resistance and good thermal stability. Pure PVDF polymer has a high melting point and crystallinity, and good mechanical properties. However, it is only soluble in a limited number of solvents, such as N-methyl-2-pyrrolidone (NMP), N,N-dimethylacetamide (DMAC), N,N-dimethylformamide (DMF), dimethyl sulfoxide (DMSO), and shows low swelling ability when soaked in common electrolytes.

The copolymer PVDF-HFP can improve the electrolyte solubility, making the polymer soluble in common organic solvents, such as acetone and tetrahydrofuran (THF), which can further improve the processing capability. In addition, it has very high swelling ability which can enhance the electrolyte uptake for the separator layer.

The inventors of the present application found that a composite of PVDF and PVDF-HFP offers many advantages over other polymers in the fabrication of separators, such as: electrochemically stable from 0 to 5V vs $Li^+/Li$; better solubility than pure PVDF alone which enhances processing; faster wettability of electrolytes than PVDF; better controlled leakage of electrolyte; durable adhesion with electrodes; and good flexibility.

The composite material may be formed into a nonwoven fiber mat by electrospinning, described in further detail below. The electrospinning may be from a polymer formulation onto aluminum foil to give a freestanding separator. The polymer formulation may include the first and second polymer materials in a total amount of about 15-25 wt. % of the formulation, preferably about 15-20 wt. %, and more preferably about 16.5 wt. %. The polymer formulation for electrospinning the separator sponge may further include about 1-5 wt. % of the at least one additive, preferably about 2-5 wt. %, more preferably about 3-5 wt. %, and most preferably about 5 wt. %. The additive may be lithium chloride (LiCl) to facilitate ion transfer across the separator and facilitate the electrospinning process by increasing the conductivity of the polymer solution. In a preferred embodiment, the polymer formulation may include about 0.1-0.6 µg of LiCl, preferably about 0.1-0.5 µg more preferably about 0.2-0.4 µg, and most preferably about 0.3-0.4 µg In another embodiment, in conjunction with any of the above and below embodiments, the polymer formulation for electrospinning the nonwoven nanofiber separator of the present application may include at least one solvent selected from the group consisting of N-methyl-2-pyrrolidone (NMP), N,N-dimethylacetamide (DMAC), N,N-dimethylformamide (DMF), dimethyl sulfoxide (DMSO), acetone and tetrahydrofuran (THF). In a preferred embodiment, the polymer formulation may include DMF and acetone. In another preferred embodiment, the polymer formulation may include DMF and acetone in a weight ratio ranging from about 3:1 to about 1:1, preferably about 2:1 to about 1:1, more preferably about 1.5:1 to 1:1, and most preferably about 1.25:1.

In another embodiment, in conjunction with any of the above and below embodiments, the nonwoven nanofiber separator of the present application may be electrospun by the following steps: adding the first and second polymer materials into the at least one solvent, optionally together with LiCl; heating the mixture at around 80-100° C. with stirring for about 2-5 hours; and optionally adding the at least one additive, followed by heating at around 80-100° C. for about 2-5 hours; cooling the polymer formulation solution to room temperature; and loading the polymer formulation solution into a carriage for electrospinning.

Electrospinning of the separator sponge of the present application may be performed under the following parameters: Temperature: about 20-30° C.; Voltage: about 20-50 kV; Relative humidity (RH): about 25-60%; Spinner height: 100-150 mm; and Feed rate: 5.5-8.5 ml/h.

In another aspect, an additive of tetramethyl orthosilicate (TMOS) or tetraethyl orthosilicate (TEOS) may be used with the polymer formulation. These additives can be hydrolyzed into ceramic components, thereby improving the surface texture and enhancing dimensional stability of the separator sponge.

Figure 3A:
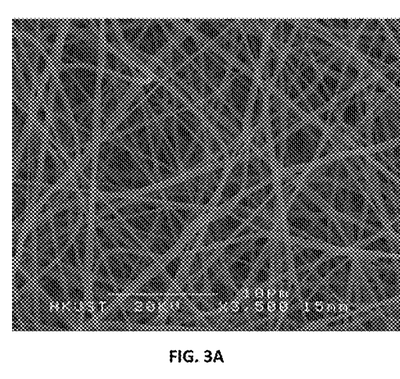
FIG. 3A depicts the structure of a separator sponge vs. a prior art separator as shown in FIG. 3B.
Figure 3B:
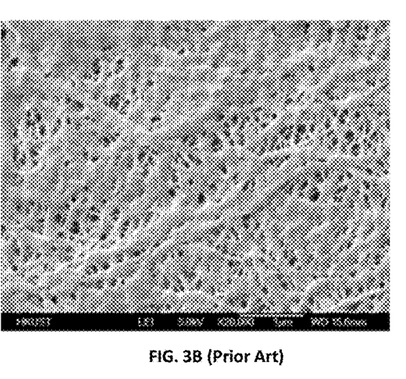

The microstructure of an exemplary separator sponge is depicted in FIG. 3A; as seen in FIG. 3A, the individual fibers are readily distinguishable and numerous pores are formed for a porosity of approximately 80 percent. By comparison, the microstructure of a prior art commercial separator (Celgard 2400 polypropylene separator) having a porosity of about 40 percent is shown in FIG. 3B. In this lower porosity structure, the individual fibers are not as readily distinguishable. The individually-interconnected fibers in the sponge of FIG. 3A create the flexible and resilient separator sponge that contributes to the self-recovery properties of the batteries of the various embodiments.

To further enhance the flexibility of the present batteries, a first package may be disposed around the surface of the first active material layer and a second package may be disposed around the surface of the second active material layer. The package may comprise a pair of polymer sheets that cover the electrodes; polymers selected from polyimides and polyethylene terephthalate (PET) may be used. The polymer sheets act as stiffeners and stress-relieving media during bending to enhance the self-recovery property of the overall battery. The batteries of the present disclosure may be packaged in flexible packages made from polymers, metals, fiberglass, and combinations thereof.

B. Component and Battery Properties

Figure 4:
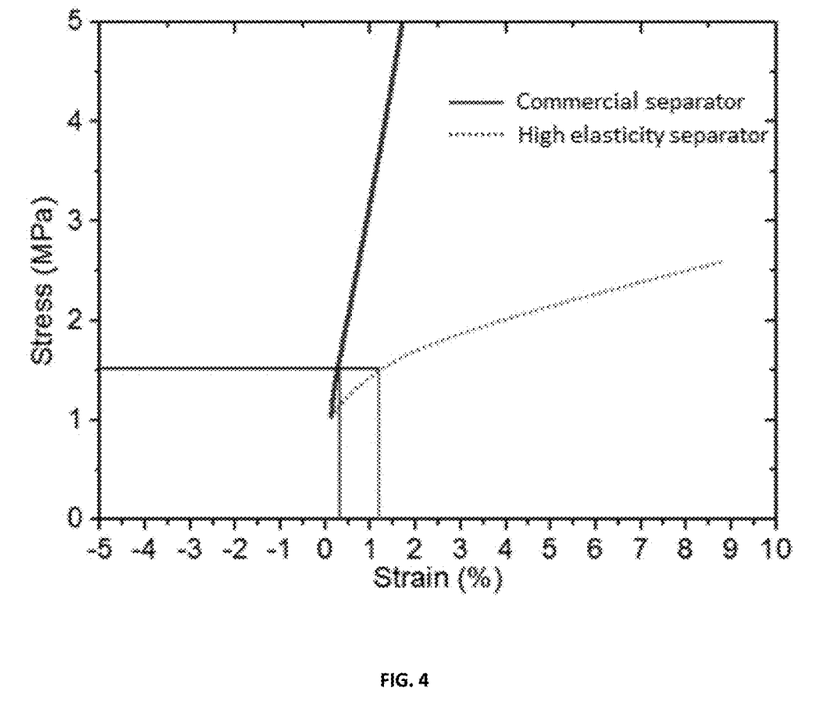
FIG. 4 is a comparison of a stress-strain curve (linear part) of the high elasticity separator sponge for the batteries of the present embodiments and a commercial separator with the same strain rate.

FIG. 4 is a comparison of stress-strain curve (linear part) of the high elasticity separator sponge for the batteries of the present embodiments and the commercial separator (Celgard 2400) with the same strain rate. As shown in FIG. 4, when subjected to the same stress from an external load along the machine direction, the high elasticity separator sponge has a strain of greater than three times the commercial one, indicating the high elasticity separator sponge is much more readily elastically deformed than the commercial separator. This elasticity causes the battery incorporating the separator sponge to have an operational bend radius of 180 degrees and self-recovery properties following application of external forces. Additionally, the separator sponge has a breaking stress of between approximately 120 MPa to approximately 140 MPa in a machine direction, and between approximately 90 MPa and 110 MPa in a transverse direction.

Figures 5A, 5B:
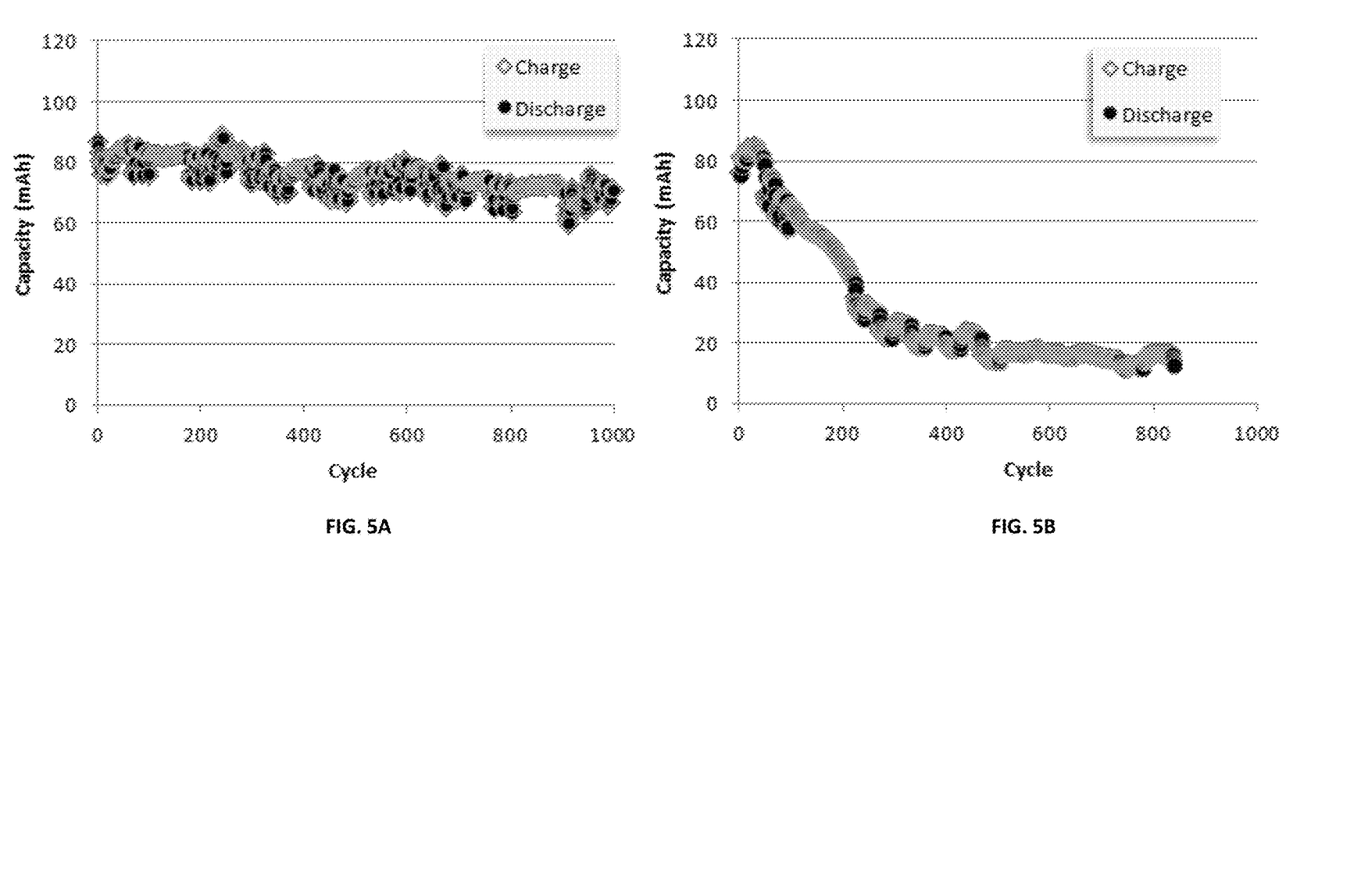

FIG. 5A is the cycling performance curve of the battery of FIG. 1 compared to FIG. 5B which is the cycling performance curve of a battery including the commercial separator. As shown in FIG. 5A, the capacity retention after 1000 cycles of charge and discharge for the battery of FIG. 1 is much higher than the battery incorporating the commercial separator, in which only 25% capacity remains following the 1000 cycles. This indicates the cycling performance of the batteries of the present disclosure incorporating a separator sponge is substantially improved over batteries employing the commercial separator.

Figure 6A:
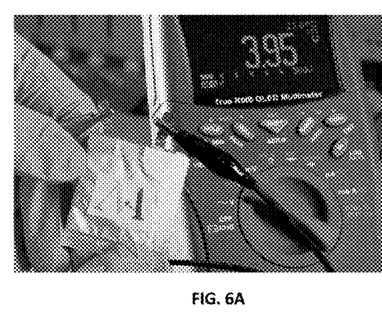
Figure 6B:
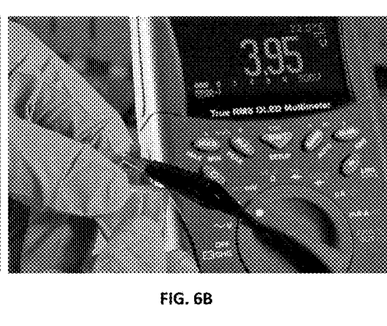
FIG. 6B shows the open circuit voltage during folding.

FIG. 6 demonstrates the operational bend radius of the batteries of the present disclosure. As described above, the operational bend radius of the battery is 180 degrees, that is, the battery may be folded while still generating electric power. FIG. 6A shows the open circuit voltage of the battery before folding while FIG. 6B shows the open circuit voltage during folding. As seen by comparing FIG. 6A to FIG. 6B, the battery open circuit voltage remains unchanged even after folding. This indicates the electrical output of the battery is stable even under a deformation of 180 degrees.

Figure 7A:
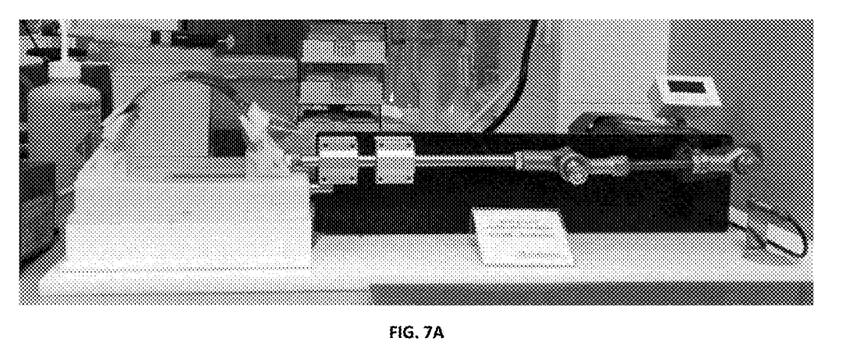
FIGS. 7A and 7B depict a configuration used to perform a bending fatigue test.
Figure 7B:
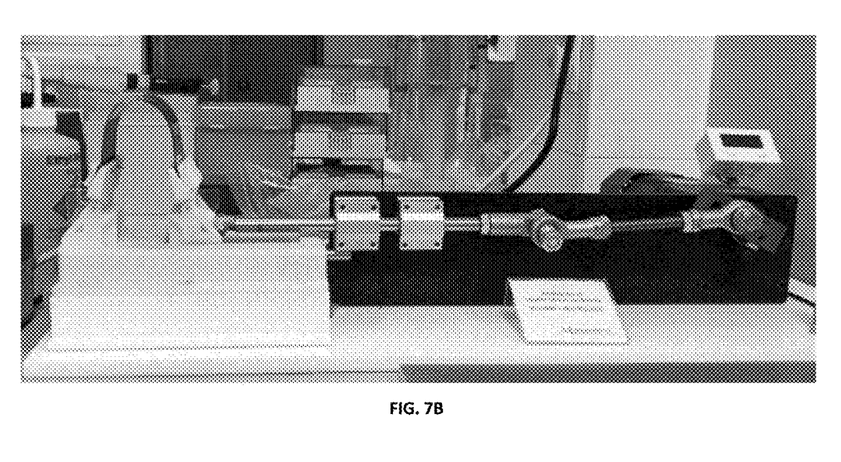
Figure 8:
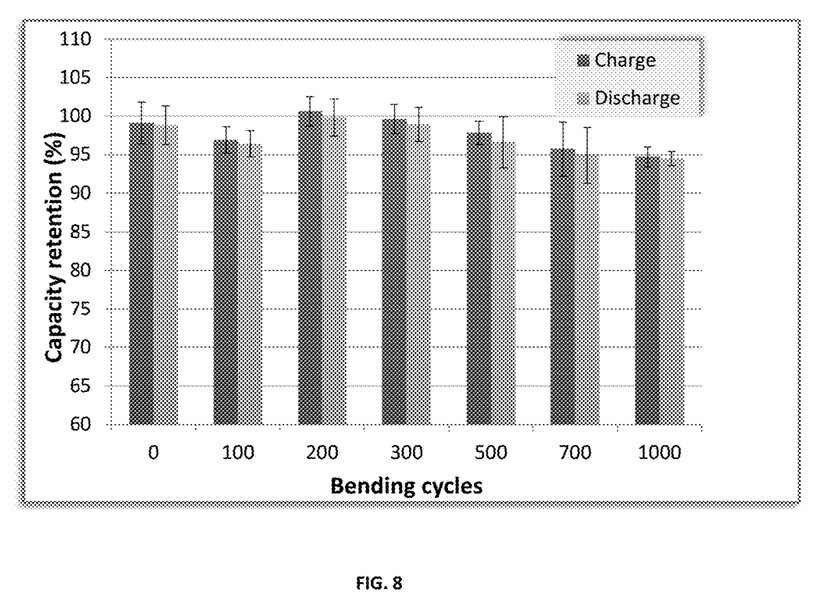
FIG. 8 depicts capacity for 1000 cycles of bending.

FIGS. 7A and 7B depict the configuration used to perform a bending fatigue test: FIG. 7A depicts a bending radius of 40 mm at a bending angle of 60°, while FIG. 7B depicts a bending radius of 20 mm at a bending angle of 165°. The batteries of FIG. 1 are bent repeatedly between a bending radius of 40 mm and a bending radius of 20 mm. The results are depicted in FIG. 8. As shown in FIG. 8, after 1000 cycles of bending, less than 5% capacity loss is observed. In comparison, conventional batteries do not have this feature, that is, commercial batteries may lose the capacity to supply electric power during one or several cycles of bending.

Figure 9A:
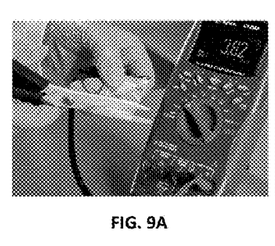
FIG. 9A depicts a voltage level before battery cutting.
Figure 9B:
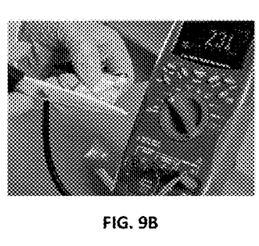
FIG. 9B depicts the voltage during battery cutting.
Figure 9C:
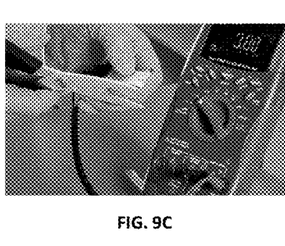
FIG. 9C depicts the voltage after battery cutting by a pair of metal scissors.

FIG. 9 depicts the open circuit voltage of the batteries of the present disclosure. FIG. 9A depicts the voltage before cutting, FIG. 9B depicts the voltage during cutting, and FIG. 9C depicts the voltage after cutting by a pair of metal scissors. As seen in FIGS. 9A-9C, during cutting, the open circuit voltage drops from a normal range to a lower range after the scissors penetrate the battery body, shorting the cathode and anode. However, due to the self-recovery property of the batteries, the voltage returns to a normal range following cutting off a portion of the battery. That is, the separator sponge recovers its original shape and volume, returning the cathode and anode to the proper, separated positions. This self-recovery property is not found in the commercial, prior art batteries. Importantly, there is no electrolyte leakage during cutting, indicating the enhanced safety level batteries of the present disclosure. Electrolyte leakage can lead to fires or explosions, thus the batteries of the present disclosure are safe even when subjected to the most rigorous of mechanical abuse.

Figure 10A:
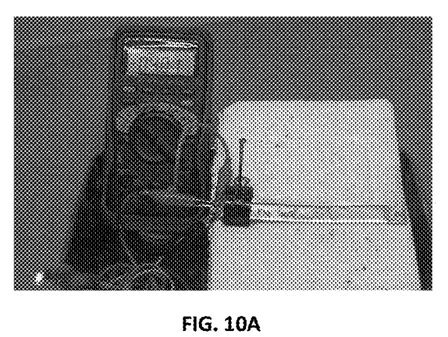
FIG. 10A depicts the open circuit voltage of the batteries of the present disclosure prior to nail penetration.
Figure 10B:
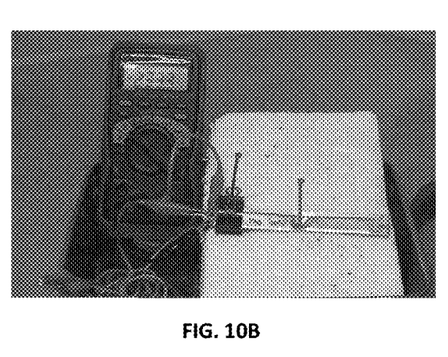
FIG. 10B depicts the voltage during nail penetration.
Figure 10C:
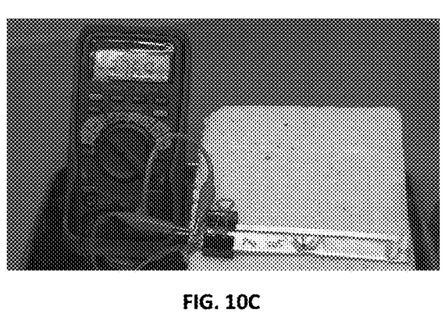
FIG. 10C depicts the voltage after nail penetration.

FIG. 10 depicts the open circuit voltage of the batteries of the present disclosure: FIG. 10A shows the voltage prior to nail penetration, FIG. 10B during nail penetration, and FIG. 10C after nail penetration. As shown in FIG. 10, the voltage drops from a normal range to a lower range after nail penetration into the body of the battery due to short between the negative and positive electrodes, which cause the LED to turn off. However, the voltage recovers back to the normal range following removal of the nail from the battery body, re-lighting the LED. The recovery of the battery open circuit voltage is attributed to the high-elasticity separator sponge which recovers its original shape and volume, returning the electrodes to their original, separated positions following removal of the external loading caused by the nail penetration. Importantly, there no electrolyte leakage, fire, or explosion during nail penetration, indicating the safety level of the batteries of the present disclosure compared to prior art commercial batteries.

The present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

The invention claimed is:

1. A flexible, foldable lithium ion battery having a self-recovery capability comprising:
a high-elasticity separator sponge having a porosity of approximately 70% to approximately 90% comprising a non-woven polymer fiber mat, the mat comprising polymer fibers having a submicron diameter, the separator sponge having a thickness in a range of approximately 5 microns to approximately 50 microns, an air permeability of approximately 100 to approximately 300 s/100 ml, a puncture resistance of approximately 350 N to approximately 950 N, the separator sponge regaining its original shape and volume following deformation by an external force;

a first electrode disposed on a first side of the separator sponge, including a first current collector having a thickness of approximately 5 microns to approximately 100 microns and including a first active material including lithium positioned on one or both sides of the first current collector;

a second electrode, disposed on a second side of the separator sponge, including a second current collector having a thickness of approximately 5 microns to approximately 100 microns and including a second active material positioned on one or both sides of the second current collector;

a liquid electrolyte absorbed by the separator sponge;

wherein the battery has an operational bend radius of up to 180 degrees with no interruption in supply of electrical power by the battery.

2. The flexible, foldable lithium ion battery of claim 1, wherein the separator sponge polymer fibers include poly(vinylidene fluoride).

3. The flexible, foldable lithium ion battery of claim 1, wherein the separator sponge polymer fibers include poly(vinylidene fluoride) and poly(vinylidene fluoride-hexafluoropropylene).

4. The flexible, foldable battery of claim 1, wherein the polymer fibers have a diameter of between approximately 100 nm and approximately 300 nm.

5. The flexible, foldable lithium ion battery of claim 1, wherein the first current collector is aluminum and the second current collector is copper.

6. The flexible, foldable lithium ion battery of claim 1, wherein the first active material is selected from $LiCoO_2$ $LiMn_2O_4$, $Li_2MnO_3$, $LiNiMnCoO_2$, $LiNiCoAlO_2$, $LiFePO_4$, or $LiNi_{0.5}Mn_{1.5}O_4$, and mixtures thereof.

7. The flexible, foldable lithium ion battery of claim 1, wherein the second active material is selected from carbon, graphite, carbon nanotubes, silicon, silicon/carbon composites, germanium, tin, metal oxides, metal hydrides, and mixtures thereof.

8. The flexible, foldable lithium ion battery of claim 1, further comprising a flexible package encompassing the first and second electrodes and separator sponge.

9. The flexible, foldable lithium ion battery of claim 8, wherein the flexible package comprises polymers, metals, fiberglass, and composites thereof.

10. The flexible, foldable lithium ion battery of claim 1, in which the separator sponge, first electrode, and second electrode are stacked to form a first cell.

11. The flexible, foldable lithium ion battery of claim 10, in which further stacks of separator sponge, first electrode, and second electrode are added to the first cell to form plural cells.

12. The flexible, foldable lithium ion battery of claim 1, in which the separator sponge, first electrode, and second electrode are rolled to form a jellyroll structure.

13. The flexible, foldable lithium ion battery of claim 1, further comprising a polymer sheet surrounding one or more of the first electrode and the second electrode.

14. The flexible, foldable lithium ion battery of claim 1, wherein the electrolyte is selected from one or more of ethylene carbonate, dimethyl carbonate, and diethyl carbonate having dissolved therein one or more lithium salts.

15. The flexible, foldable lithium ion battery of claim 14, wherein the lithium salts are selected from $LiPF_6$, $LiBF_4$, or $LiClO_4$.

16. The flexible, foldable lithium ion battery of claim 1, wherein the high-elasticity separator sponge has a breaking stress of between approximately 120 MPa to approximately 140 MPa in a machine direction, and between approximately 90 MPa and 110 MPa in a transverse direction.

* * * * *